(12) United States Patent
Utz et al.

(10) Patent No.: US 8,131,904 B2
(45) Date of Patent: Mar. 6, 2012

(54) PROCESSING MODULE, INTERFACE, AND INFORMATION HANDLING SYSTEM

(75) Inventors: James R. Utz, Round Rock, TX (US); Andrew T. Sultenfuss, Leander, TX (US)

(73) Assignee: Dell Products, LP, Round Rocks, TX (US)

( * ) Notice: Subject to any disclaimer, the term of this patent is extended or adjusted under 35 U.S.C. 154(b) by 116 days.

(21) Appl. No.: 12/189,000

(22) Filed: Aug. 8, 2008

(65) Prior Publication Data

US 2010/0036983 A1 Feb. 11, 2010

(51) Int. Cl.
H05K 7/10 (2006.01)
G06F 3/00 (2006.01)
G06F 15/00 (2006.01)
G06F 15/76 (2006.01)

(52) U.S. Cl. ............. 710/301; 710/14; 710/19; 712/28; 712/34

(58) Field of Classification Search .............. 710/10–11, 710/14, 19, 105, 301–304; 345/502–504; 712/34; 713/300, 310, 320, 323–324
See application file for complete search history.

(56) References Cited

U.S. PATENT DOCUMENTS 4,720,798 A * 1/1988 Reed et al. ...................... 716/19
(Continued)

FOREIGN PATENT DOCUMENTS

WO WO 2007004178 A1 * 1/2007

*Primary Examiner* — Thomas J Cleary
(74) *Attorney, Agent, or Firm* — Larson Newman, LLP

(57) ABSTRACT

A processing module, interface, and information handling system are disclosed. According to an aspect, a processing module can include a plurality of components coupled to a circuit card operable to be coupled to a host processing system. The processing module can also include a processing module interface configured to be coupled to a host interface of the host processing system. According to an aspect, the processing module interface can include a plurality of contacts operable to couple a plurality of signals configured to be coupled between the host processing and the circuit card to enable or disable use of resources of the circuit card during a reduced operating state of the host processor.

17 Claims, 3 Drawing Sheets

U.S. PATENT DOCUMENTS

| | | | |
|---|---|---|---|
| 5,303,171 A * | 4/1994 | Belt et al. | 713/321 |
| 5,586,270 A * | 12/1996 | Rotier et al. | 710/301 |
| 5,644,760 A * | 7/1997 | Polzin et al. | 713/500 |
| 5,727,231 A * | 3/1998 | Bartley et al. | 710/38 |
| 5,748,912 A * | 5/1998 | Lee | 710/301 |
| 5,999,997 A * | 12/1999 | Pipes | 710/303 |
| 6,029,211 A * | 2/2000 | Nakashima | 710/14 |
| 6,549,968 B1 * | 4/2003 | Hart | 710/303 |
| 6,735,663 B2 | 5/2004 | Watts, Jr. et al. | |
| 6,735,708 B2 | 5/2004 | Watts, Jr. | |
| 6,801,974 B1 | 10/2004 | Watts, Jr. et al. | |
| 6,816,925 B2 | 11/2004 | Watts, Jr. | |
| 7,149,837 B2 | 12/2006 | Watts, Jr. et al. | |
| 7,197,584 B2 | 3/2007 | Huber et al. | |
| 7,428,142 B1 * | 9/2008 | Ligtenberg et al. | 361/679.55 |
| 2002/0103005 A1 | 8/2002 | Watts, Jr. et al. | |
| 2003/0110306 A1 * | 6/2003 | Bailis et al. | 709/253 |
| 2004/0088262 A1 * | 5/2004 | Boucher et al. | 705/65 |
| 2004/0160435 A1 * | 8/2004 | Cui et al. | 345/211 |
| 2005/0138267 A1 * | 6/2005 | Bains et al. | 711/100 |
| 2005/0240702 A1 * | 10/2005 | Kunkel et al. | 710/300 |
| 2007/0094435 A1 * | 4/2007 | Fry et al. | 710/303 |
| 2007/0213105 A1 | 9/2007 | Huber et al. | |
| 2008/0004889 A1 * | 1/2008 | Edwards et al. | 705/1 |
| 2008/0272880 A1 * | 11/2008 | Sutardja et al. | 340/5.2 |

* cited by examiner

PROCESSING MODULE, INTERFACE, AND INFORMATION HANDLING SYSTEM

FIELD OF DISCLOSURE

This disclosure relates generally to information handling systems, and more particularly to a processing module, interface, and information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can be configured to use a variety of hardware and software components that can be configured to process, store, and communicate information and can include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

Figure 1:
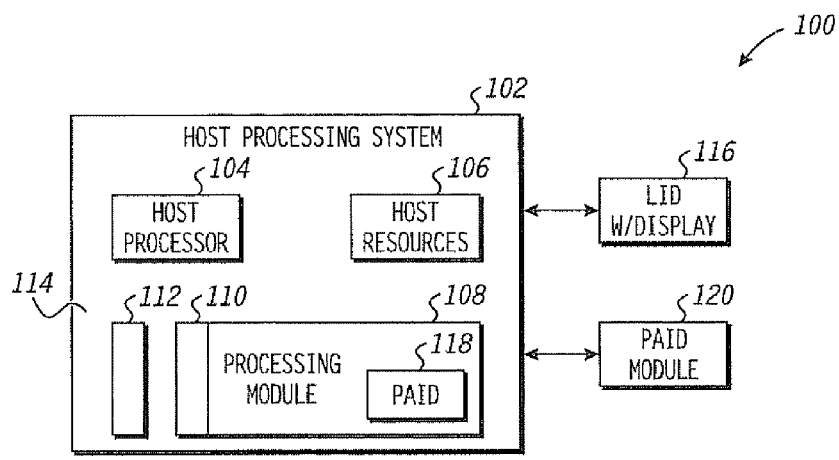
FIG. 1 illustrates a functional block diagram of an information handling system according to an aspect of the disclosure.

The following description in combination with the figures is provided to assist in understanding the teachings disclosed herein. The following discussion will focuses on specific implementations and embodiments. This focus is provided to assist in describing the teachings and should not be interpreted as a limitation on the scope or applicability of the teachings. However, other teachings can certainly be used in this application. The teachings can also be used in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

Portions of an information handling system, when referred to as a "device," a "module," or the like, can be configured as hardware, software (which can include firmware), or any combination thereof. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). Similarly, the device could be software, including firmware embedded at a device, such as a Pentium class or PowerPC™ brand processor, or other such device, or software capable of operating a relevant environment of the information handling system. The device could also be a combination of any of the foregoing examples of hardware or software. Note that an information handling system can include an integrated circuit or a board-level product having portions thereof that can also be any combination of hardware and software.

Devices or programs that are in communication with one another need not be in continuous communication with each other unless expressly specified otherwise. In addition, devices or programs that are in communication with one another may communicate directly or indirectly through one or more intermediaries.

Embodiments discussed below describe, in part, distributed computing solutions that manage all or part of a communicative interaction between network elements. In this context, a communicative interaction may be intending to send information, sending information, requesting information, receiving information, receiving a request for information, or any combination thereof. As such, a communicative interaction could be unidirectional, bidirectional, multi-directional, or any combination thereof. In some circumstances, a communicative interaction could be relatively complex and involve two or more network elements. For example, a communicative interaction may be "a conversation" or series of related communications between a client and a server—each network element sending and receiving information to and from the other. The communicative interaction between the network elements is not necessarily limited to only one specific form. A network element may be a node, a piece of hardware, software, firmware, middleware, another component of a computing system, or any combination thereof.

In the description below, a flow charted technique may be described in a series of sequential actions. Unless expressly stated to the contrary, the sequence of the actions and the party performing the actions may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

To the extent not described herein, many details regarding specific materials, processing acts, and circuits are conventional and may be found in textbooks and other sources within the computing, electronics, and software arts.

An information handling system and method of using it are described below. An exemplary, non-limiting system description is described before addressing methods of using it. Some of the functionality of modules within the system is described with the system. The utility of the system and its modules will become more apparent with the description of the methods that follow the description of the system and modules.

According to an aspect of the disclosure, a processing module is disclosed. The processing module can include a plurality of components coupled to a circuit card operable to be coupled to a host processing system. The processing module can also include a processing module interface configured to be coupled to a host interface of the host processing system. According to an aspect, the processing module interface can include a plurality of contacts operable to couple a plurality of signals configured to be coupled between the host processing and the circuit card to enable or disable use of resources of the circuit card during a reduced operating state of the host processor.

According to another aspect of the disclosure, a host interface comprising is disclosed. The host interface can include a plurality of host contacts configured to be coupled to a processing module interface of a processing module operable to be coupled to a host processing system. The plurality of contacts can be configured to be coupled a plurality of signals between the host processing system and the processing module to enable or disable use of the components of the processing module during a reduced operating state of a host processor of the host processing system.

According to a further aspect of the disclosure, an information handling system is disclosed. The information handling system can include a main circuit board including a host processor configured to operate in a run operating state and a reduced operating state. The information handling system can also include a plurality of host contacts configured to be coupled to a processing module interface of a processing module operable to be coupled to the host processor. The processing module can also include a processing module interface configured to be coupled to the host interface. The processing module interface can include a plurality of contacts operable to couple a plurality of signals configured be coupled between the host processor and the processing module to enable or disable use of the components of the processing module during a reduced operating state of the host processor.

FIG. 1 illustrates a functional block diagram of an information handling system according to an aspect of the disclosure. The information handling system, generally depicted at 100, can include a host processing system 102 that can include a host processor 104, and host resources such as a CPU chipset, memory, a host operating system, and various other resources and components which can be combined to form an information handling system (not illustrated). The information handling system 100 can include various other components or resources as described in FIGS. 2-4 below.

According to an aspect, the information handling system 100 can also include a processing module (PM) 108, a processing module interface 110, and a host interface 112, and processing module resources such as a CPU chipset, memory, a processing module operating system, and various other resources and components which can be used with the PM 108 (not illustrated). The host interface 112 can be coupled to a main board 114 operably coupled to the host processor 104 and the host resources 106. The information handling system 100 can also include a lid housing a display 116 operable coupled to the host processing system 102.

According to an aspect, the PM 108 can include a PAID device or value 118 that can be updated to enable use of the PM 108. Additionally, the host processing system 102 can include a PAID module 120 that can access the PAID value 118 to detect whether the PM 108 exists, and can further enable access to resources of the PM 108. For example, a user may purchase a build-to-order information handling system. The user can further purchase one or more applications that can be configured within the processing module 108 and enabled upon validating the PAID value 118. In a particular form, the processing module 108 can include a plurality of resources or applications, and a user can purchase a subset of the resources or applications. As such, the PAID value 118 may be encrypted to identify which resources or applications may have been purchased, and can be further validated by the PAID module 120.

According to an aspect, the PM 108 can incorporate various resources or applications, or various combinations of applications such as PC radio emulations, transcoders, encryption applications, GPS applications, biometric applications, camera applications, USB concentrator applications, Voice-Over-Internet Protocol (VOIP) applications, persistent hardware assisted virtual management, wake events, system management applications, various other peripheral resource applications and devices, or any combination thereof. In various forms, the PM 108 can employ applications, devices, modules, or any combination thereof as an independent peripheral resource, a separate system that can operate as system within the information handling system 100, or any combination thereof.

Figure 2:
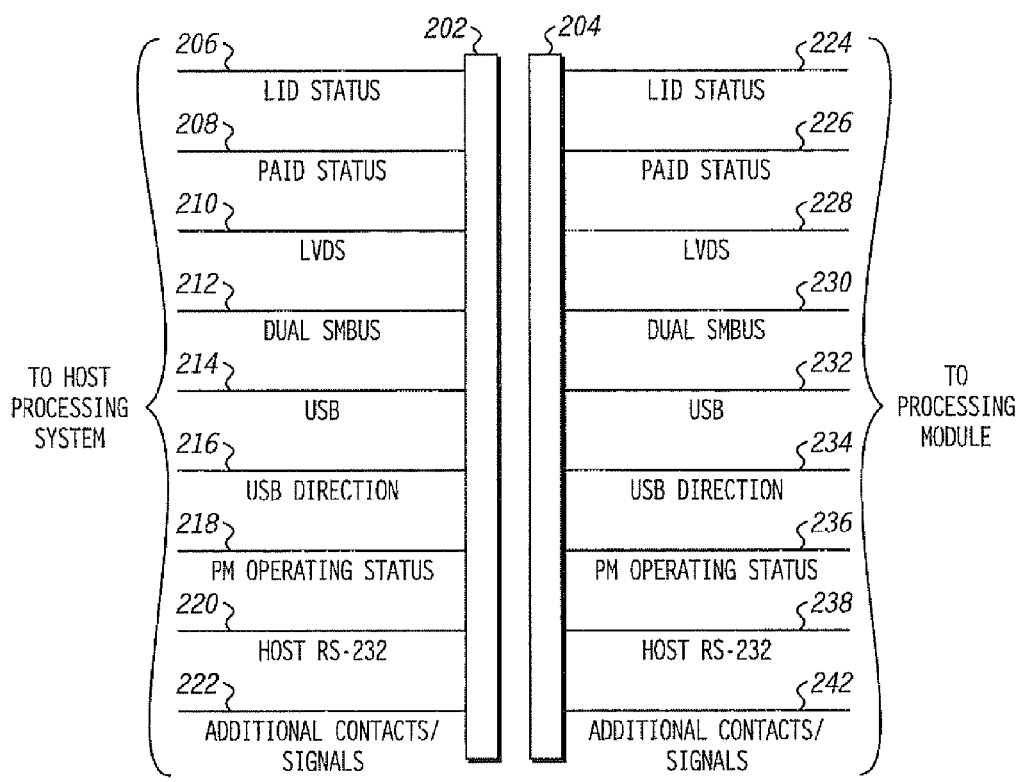
FIG. 2 illustrates interfaces configured to enable access to a processing module according to an aspect of the disclosure.

FIG. 2 illustrates interfaces configured to enable a processing module according to an aspect of the disclosure. The interfaces, generally illustrated at 200, can include a host interface 202 operable to be coupled to a processing module interface 204 of a processing module (not illustrated).

According to an aspect, the host interface 200 can include a lid status contact 206, a PAID status contact 208, a low-voltage display signal (LVDS) contact 210, a dual SMBUS contact 212, a USB contact 214, a USB direction contact 216, a processing module (PM) operating status contact 218, a host RS-232 contact 220, or any combination thereof. The host interface 202 can also include any combination of additional contacts, signals, buses, communication links, generally illustrated at 222 that can be coupled to a host interface 202 to enable use or access to resources of a processing module.

According to a further aspect, the host interface 200 can include a lid status contact 224, a PAID status contact 226, a LVDS contact 228, a dual SMBUS contact 230, a USB contact 232, a USB direction contact 234, a PM operating status contact 236, a host RS-232 contact 238, or any combination thereof. The host interface 202 can also include any combination of additional contacts, signals, buses, communication links, generally illustrated at 242 that can be coupled to a processing module interface 204 to enable use or access to resources of a processing module.

Figure 3:
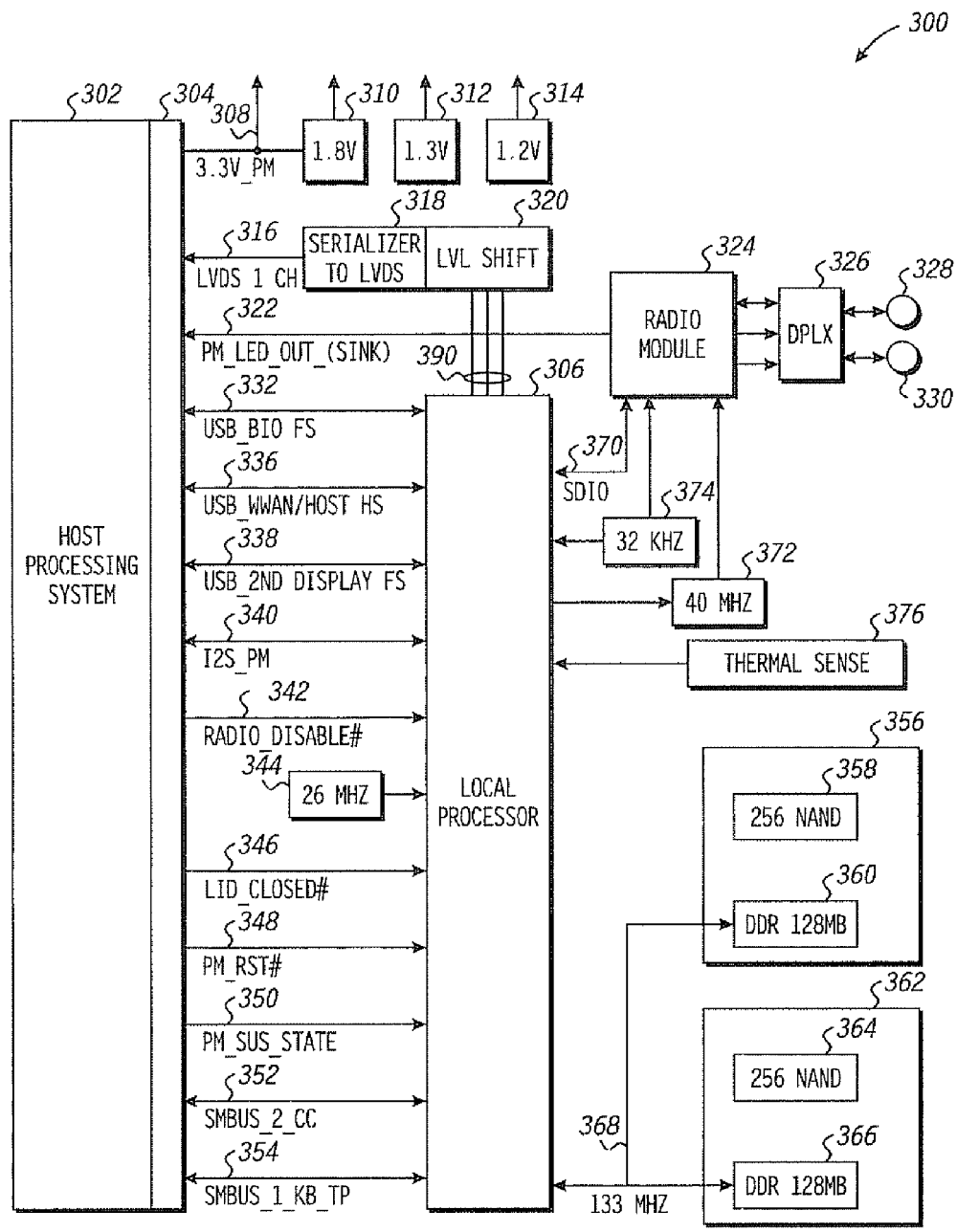
FIG. 3 illustrates a functional block diagram of a processing module accessible to a host system using a processing module interface according to another aspect of the disclosure.

FIG. 3 illustrates a functional block diagram of a processing module (PM) 300 having a processing module interface 304 operable to be coupled to a host processing system 302 according to an aspect of the disclosure. According to an aspect, the PM 300 can include the PM 108 described in FIG. 1. The processing module interface 304 can be configured to couple various components of the PM 300 and the host processing system 302. According to an aspect, the processing module interface 304 can include a Minicard enabled interface operable to be coupled to a Minicard enabled interface (not illustrated) of a host processing system 302. The processing module interface 304 can include a local processor 306 such as a Texas Instruments (TI) OMAP 2430, 3430, Nvidia AP10, AP15, Motorola I.MX 32, 51, or any other processor that can be used as a processor within the PM 400. The processing module interface 304 can also include a 3.3 Volt input signal 308 input from the host processing system 302. The 3.3 Volt input signal can be used to generate a 1.8 Volt signal 310, a 1.3 Volt signal 312, and a 1.2 Volt signal 314 to power various components of the PM 300.

According to an aspect, the PM 300 can include a local processor 306 such as a Texas Instruments (TI) OMAP 2430, 3430, Nvidia AP10, AP15, Motorola I.MX 32, 51, or any other processor that can be used as a processor within the PM 300. The PM 300 can also include a 3.3 Volt input signal 308 coupled input from the host system 302 via the interface 304. The 3.3 Volt input signal can be used to generate a 1.8 Volt signal 310, a 1.3 Volt signal 412, and a 1.2 Volt signal 314 to power various components of the PM 300.

According to a further aspect, the Interface 304 can output a low voltage display signal ("LVDS 1CH") 316 output via a serializer-to-LVDS module 318 and a level (LVL) shift module 320. For example, the serializer to LVDS module and LVL shift module 320 can be operable to convert signals from a parallel type input 390 coupled to the LVL shift 320, to a serialized output using the serializer-to-LVDS module 318. Although described as an LVDS 1 CH signal, an LVDS 2 CH signal, or any combination thereof can be output. According to another aspect, a display port, a high definition media interface (HDMI) enabled port, or any combination thereof can be also used, and signals output can be converted as needed or desired. The LVL shift module 320 can be coupled to the local processor 306 via a data bus 390. The interface 304 can further include a radio synch signal ("MMPM_LED_OUT_(Sink)") 322 output by a radio module 324. The radio module 324 can be configured as a WIFI (e.g. B, G, etc.) radio and can be coupled to a duplex module 326 operable to receive signals from a first antenna 328 and a second antenna 330. The radio module 324 can be integrated as a part of the local processor 306, or in other forms can accessed as a resource of the local processor 306. According to a further aspect, the duplex module 326 can be configured to duplex signals of the antenna 328 and the antenna 330. For example, each antenna 328 and 330 and can be activated and deactivated independently or in combination, and used via the radio module 324 in response to an operating condition of the local processor 306 and a desired signal to be sent or received.

The processing module interface 304 can also include a USB link operable to communicate a USB BIOS signal ("USB_BIOS FS") 332 between the processing module interface 304 and the local processor 306. The processing module interface 304 can also be used to couple a WWAN-Host signal ("USB_WWAN/HOST HS") 336 to the local processor 306 using a USB link. The processing module interface 304 can also be used to couple a secondary display signal ("USB_2nd_display FS") 338 to the local processor 306 using a USB link.

The processing module interface 304 can also be used to couple an I²S enabled signal ("I2S_PM") 340 to the local processor 306. The processing module interface 304 can also be used to couple a radio disable input signal ("Radio_disable#") 342 to the local processor 306. The local processor 306 can receive a twenty-six megahertz clock signal 344 from a local crystal or other clocking device. The processing module interface 304 can also couple additional signals to the local processor 306 that can include a reset signal ("PM_RST#") 348, can be used to reset the module 300, components within, or any combination thereof. The PM_RST# signal 348 can also be used to reset the host system 302, and components thereof. The PM_RST # signal 348 can be enabled as a shared signal or as a non-shared signal accessible by the host system 302, the local processor 306, or any combination thereof. a "PM_SUS_State" signal 350 can include a suspend signal to alter a state of the PM 300 and can be used to enable or recover from a suspend state. For example, the PM 300 can be placed in a suspend state and recoverable using the PM_SYS_State signal 350. In another form, the PM_SYS_State 350 signal can be used to enable the host system 302 or components thereof. The PM_SYS State 350 can be enabled as a shared signal or as a non-shared signal accessible by the host system 302, the local processor 306, or any combination thereof.

According to a further aspect, a the interface 304 can include a "SMBUS_2_CC" signal 352 that can be used as a command control bus operable to couple control information between the host system 302 and the local processor 306. The SMBS_2_CC signal 352 can be used to control audio volume, LCD brightness, etc. of the host processor 302. The interface 304 can also include a "SMBUS_1_KB_TP" signal 354 operable to be couple keyboard touchpad interface signals that can be read by a controller of a keyboard, touchpad, etc. and converted and coupled to the local processor 306.

According to a further aspect, the local processor 306 can access a resource module 356 including 256K NAND memory 358 and 128 MB of DDR memory 360. The local processor 306 can also be coupled to a resource module 362 including 256K NAND memory 364 and 128 MB of DDR memory 366. Each resource module 356 and 362 can be coupled to the local processor 306 using a 133 MHz data bus 368. Other memory sizes and data bus speeds can also be used.

According to a further aspect, the local processor 306 can also be coupled to the radio module 324 using an SDIO bus 370. The local processor 306 can further output a 40 MHz clock signal 372 that can be coupled to the radio module 324. A 32 KHz signal 374 can further also be coupled to the radio module 324 and the local processor 306 to synchronize signal timing. A thermal sense input 376 can also be coupled to the local processor 306 to monitor operating temperature of the PM 300.

According to a particular aspect, the local processor 306 can be used to output a video output signal to be displayed using an external display of the host processing system 302. For example, the local processor 306 can format a video output and output a video output signal using the secondary display signal 338. As such, the secondary display signal 338 can couple the video output signal to the host processing system 302 to be displayed using an external display. In this manner, the local processor 306 can be used during a reduced operating state of the host processing system 302 to output video using a second display as desired.

According to another aspect, the resource modules 356, 362 can store various applications or peripheral sources can include PC radio emulations, transcoders, encryption applications, GPS applications, biometric applications, camera applications, USB concentrator applications, Voice-Over-Internet Protocol (VOIP) applications, persistent hardware assisted virtual management, wake events, system management applications, one or more operating systems, file systems, various other peripheral resource applications and devices, patches, virus scanning software, security applications, or any combination thereof.

According to a further aspect, the local processor 306 can also incorporate the resource module 456, the resource module 462, or any combination thereof. Additionally, the processing module interface 304 can couple a lid status signal ("LID_closed #") 346 to indicate whether a lid of the host processing system 302 may be opened or closed. For example, the host processing system 302 can include a laptop or other portable system that includes a lid with a display integrated along an internal portion. As the lid is opened, the host processing system 302 can couple an input using lid status signal 346 to the local processor 306, and the local processor 306 can couple a video output signal to be output using the LVDS 1 CH signal 316. As a user closes the lid, a signal can be coupled to the lid status 346 indicating that the lid has been closed. The local processor 306 can also couple a video output signal to the second display signal 338 that can be coupled to a second display such as an external display (not illustrated). In this manner, a second display, such as an external display provided along an external portion of the housing of the host processing system 302 can output a video output signal as the lid is closed.

According to a further aspect, the host processing system 302 can access resources of the PM 300 as a peripheral device. For example, the host processing system 302 can access resources of the PM 300 and offload processing, expand functionality, augment or complement features of the host processing system 302. During a run-time operating environment of the host processing system 302, the host processing system 302 can be coupled to the PM 300 using a peripheral communication bus such as a USB BIOS FS (full speed) signal 332 operable to be enabled during a peripheral operating mode of the PM 300. For example, a digital camera (not illustrated) can be coupled to the local processor 306 and enabled via the local processor as a peripheral device using the USB BIOS FS 332.

According to another aspect, the PM 300 can be used as a separate or auxiliary system to the host processing system 302 when the host processing system 302 may be operated in a reduced operating mode. For example, a user may desire to access a PM 300 resource when the host processing system 302 may be in a reduced operating mode. As such, the PM 300 can be enabled and the local processor 306 can access and enable resources of the PM 300 without having to initialize the host processing system 302 to a run-state operating mode.

Figure 4:
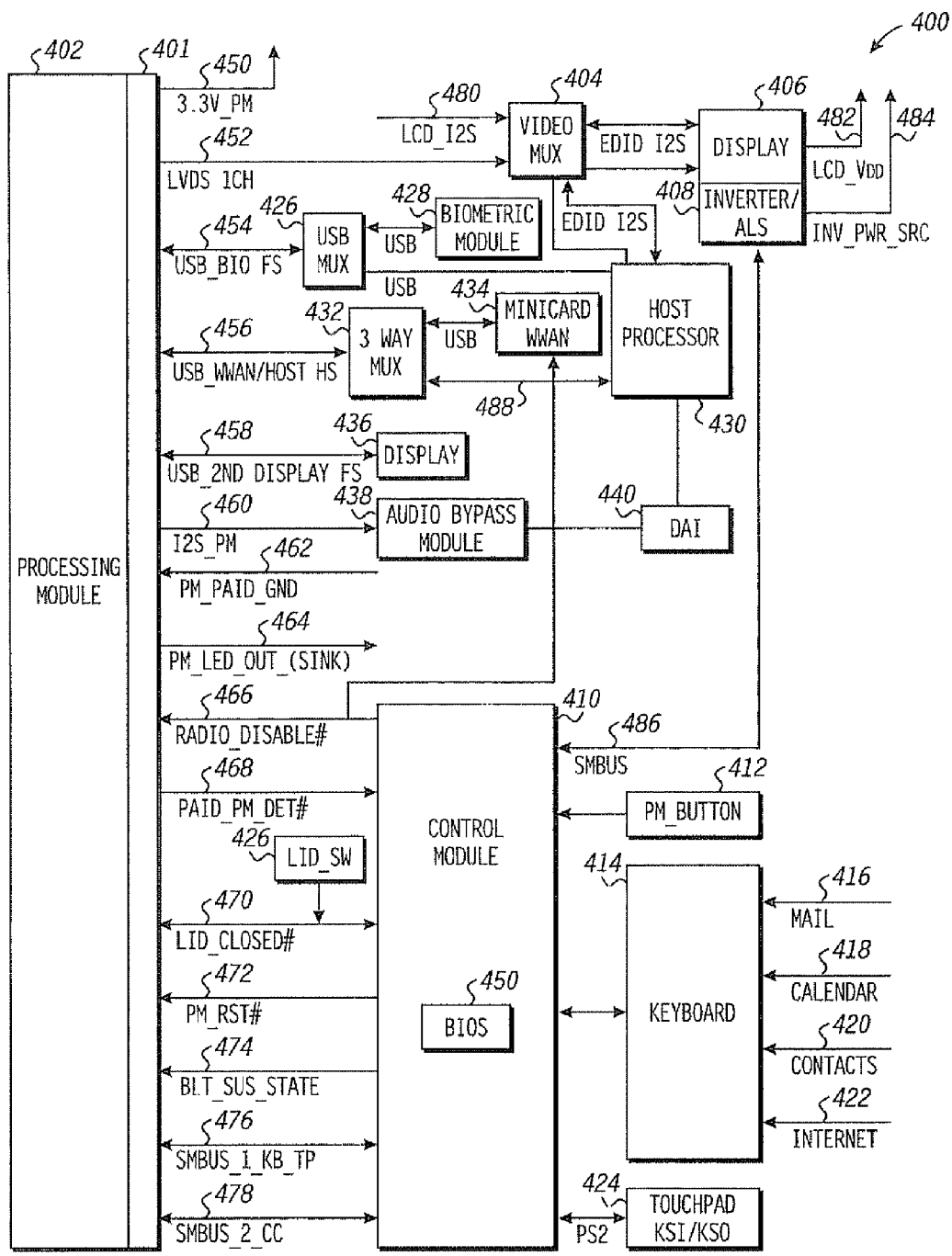
FIG. 4 illustrates a functional block diagram of an information handling system employing a processing module accessible using a host interface according to an aspect of the disclosure.

FIG. 4 illustrates a functional block diagram of an information handling system employing a host interface configurable to be coupled to a remote processing module according to an aspect of the disclosure. An information handling system, generally illustrated at 400, can employ a host interface 401 configurable to be coupled to a processing module (PM) 402 according to an aspect of the disclosure. The PM 402 can include the processing module 108 described in FIG. 1, processing module 300 described in FIG. 3, or any other module that can be coupled to the host interface 401.

According to an aspect, the host interface 401 can be coupled to a video multiplexer 404 operable to multiplex and output a single channel low voltage display signal (LVDS 1 CH) output by the PM 402 to be displayed using the display 406. In a form, the PM 402 and host interface 401 can be realized as Minicard enabled interfaces. For example, the host interface 401 can be coupled to a Minicard enabled module such as a Minicard WWAN.

The information handling system 400 can also include a control module 410 that can include an SIO integrated flash module that can include a BIOS 450 operable to be used to initiate various resources of the information handling system 400. The inverter and ALS module 408 can be coupled to the control module 410 via an SMBUS. The control module 410 can also be coupled to a PM power button 412 operable to initiate a remote processor operating mode of the information handling system 400 using the PM 402. The control module 410 can also be coupled to a keyboard 414 that can include a qwerty keyboard having a mail button 416, a calendar button 418, a contacts button 420, and an Internet access button 422. Each button 416, 418, 420, and 422, alone or in combination, can be configured as a separate module or a part of another portion of the information handling system 400. The keyboard 414 can also include various other types of function keys as needed or desired. According to an aspect, the display 436 can be a touch screen enabled display and can couple an input to the control module 410.

The information handling system 400 can also include a USB MUX 426 coupled to a biometric module 428 operable to input biometrics of a user. The USB MUX 426 can further be coupled to a host processor 430 of the information handling system 400, and the host interface 401.

In another embodiment, an "LCD_I2S" signal can be coupled directly to the PM 402 and can be selectively enabled by the PM 402 and can be used to identify a type of display installed. For example, a display classification can be determined and read using the LCD_I2S input 480. As such, a video output format can be determined to be output to the display 506. The video MUX 404 can couple multiplexed signals to the display 406 powered by a display power source ("LCD_Vdd") 482. The display 406 includes an inverter and ALS module 408 powered by an inverter power source ("INV_PWR_SRC") 484.

The control module 410 can also be coupled to a touchpad 424 that enables use of a pointer or pointing device that can be displayed on the display 406. The control module 410 can also be coupled to a lid switch ("LID_SW") input 426 operable to alter a signal when a lid or display of the information handling system 400, other type of mobile information handling system, may be opened or closed.

According to a further aspect, the host interface 401 can also include the audio bypass ("I2S_BLT") input 438 coupled to an audio bypass module 438. The audio bypass module 438 can be coupled to a digital audio interface (DAI) module 440 via an $I^2S$ bus. The DAI module 440 can further be coupled to the host processor 430 via the $I^2S$ bus.

According another aspect, the host interface 401 can also include various other inputs, outputs, or combinations thereof. For example, the host interface 401 can include a voltage source input ("3.3V_PM") 450, a USB enabled biometric link ("USB_BIO FS") 454, a USB enabled WWAN and host system link ("USB_WWAN/HOST HS") 456, a USB enabled second display link ("USB_2nd Display FS") 458, a $I^2S$ ("I2S_PM") input 460, a ground input ("PM_PAID_GND") 462, and an RPI LED ("PM_LED_Out (Sink)") output 464.

The host interface 401 can also include a radio disable ("Radio_disable#") input 466, a paid detection ("PAID_PM_DET#") input 468, a PM reset ("PM_RST#") input 472, a PM sustain state ("BLT_SUS_State") input 474, a SMBUS keyboard enable ("SMBUS_1_KB_TP") link 476, and an SMBUS 2 CC ("SMBUS_2_CC") link 478.

According to a further aspect, the WWAN access ("USB_WWAN/HOST HS") link 456 can be coupled to a three (3) way MUX 432. The Minicard WWAN 434 can be configured to be coupled to the host processor 430 using a USB enabled bus. The PM 402 can also be coupled a display 436 using display ("USB_second display") link 458.

According to another aspect, the PM 402 can output a video output signal using the LVDS 1CH signal 452. Additionally, the video output signal can be coupled to the video multiplexer 404 to be displayed using the display 406. In another form, the display 406 can be placed in a non-operating mode. For example, the host processor 430 can be placed in a reduced operating state, and the display 406 can also be placed in a reduced operating state. One example can include the lid of a laptop being closed. As such, the PM 402 can detect the lid being closed, and couple a vide output signal to the USB_2nd Display FS signal 458 to be output to the display 436. In this manner, the host processor 430 and the display can in a reduced operating state, and the PM 403 can be used to access the display 436 to output a video signal as desired.

According to a further aspect, the information handling system 400 can access resources of the PM 402 as a peripheral device. For example, the information handling system 400 can access resources of the PM 402 and offload processing, expand functionality, augment or complement a features of the information handling system 400. During a run-time operating environment of the information handling system 400, the information handling system 400 can be coupled to the PM 402 using a peripheral communication bus such as USB BIOS FS 454. As such, the information handling system 400 can access resources of the PM 402 as single, or a combination of, peripheral devices.

According to another aspect, the PM 402 can be used as a separate or auxiliary system to the information handling system 400 when the information handling system 400 may be operated in a reduced resource or reduced-state operating mode. For example, a user may desire to access the PM 402 resource when the information handling system 400 may be in a reduced operating mode.

According to another aspect, the PM 402 can output a video output signal and an audio output signal during a reduced operating condition of the host processor 430. For example, the PM 402 can output a video output signal to the display 436, and can further output an audio signal to the audio bypass module 438 which can be activated during the reduced operating condition of the host processor 430. In other forms, the audio bypass module 438 and associated components sufficient to output audio can be enabled and disabled in response to a lid of the information handling system being opened and closed.

During operation, PM 402 can be configured to can detect a user initiated event, a non-user initiated event, or any combination thereof. For example, a user initiated event can include a user activating a key, button, or other type of hardware, software, or user selectable interface, or combinations thereof, that can generate a user activated event. For example, a user can select a button to access a messaging application of the information handling system 400. As such, the PM 402 can detect a request to access the messaging application and the PM 402 can initiate access to resource of the information handling system 400 during a reduced operating state of the information handling system 400.

According to another aspect, the PM 402 can detect a non-user initiated event. For example, the information handling system 400 can employ the Minicard WWAN 434 operable to receive communication signals via a wireless communication. The Minicard WWAN 434, coupled to the PM 402, can detect the non-user initiated event. The PM 402 can identify a resource profile (not illustrated) of the detected event, and initiate activation of resources of the information handling system 400 to process the non-user initiated event.

In another form, the information handling system 400 can detect a non-user initiated event communicated to an electronic device other than the information handling system 400 during a reduced operating state of the information handling system 400. For example, the PM 402 can be configured to detect a message formatted to be received by a smart phone device, Blackberry device, or any type of electronic device configured to receive messages. For example, the information handling system 400 employing a Minicard WWAN 434 can be operable to detect wireless messages communicated via any wireless network operable to communicate messages. For example, a wireless messaging network such as an SMS network, Blackberry enabled network, or any other type of messaging enabled wireless or wireline network.

In an exemplary form, the information handling system 400 can be operating in a low-power operating state that can include sufficient resources to detect a wireless signal. As such, the PM 402 and control module 410 can be used to determine a current operating state of the information handling system 400, and can initiate enabling resources to process and output a response to the received wireless signal. As such, an operating environment to output a response to a message, such as a Blackberry message, can be enabled using a limited amount of resources without having to initialize additional resources of the information handling system 400. For example, the PM 402 in combination with the control module 410 can be used to enable access to the display 406 to output a received message. Additionally, the keyboard 414 or other devices or components of the information handling system 400 can be powered to enable a user to view and respond to a message. As such, a limited resource operating environment can be generated to enable receipt and response to messages without having to initialize the information handling system 400. In this manner, a laptop or notebook system can be used to receive messages that may be intended for a Blackberry or other type of messaging device, thereby allowing a user to view messages using a larger display relative to the Blackberry device or smart phone device, and draft and respond to messages using the keyboard 414 and the display 406 as desired.

According to a particular aspect, the information handling system 400 can enable the PM 402 as a peripheral device accessible to the host processor 430 or other components of the information handling system 400. For example, the host processor 430 can be operated in a run-time operating mode, and can further access one or a combination of independent peripheral resources of the PM 402 as peripheral resource or device. For example, the host processor 430 can offload processing or applications to the PM 402 by using the PM 402 as a peripheral device. Various peripheral devices or applications the PM 402 can be enabled including PC radio emulations, transcoders, encryption applications, GPS applications, biometric applications, camera applications, USB concentrator applications, VOIP applications, persistent hardware assisted virtual management, wake events, system management applications, various other peripheral resource applications and devices, or any combination thereof. In various forms, the PM 402 can employ applications, devices, modules, or any combination thereof as a peripheral resource.

Note that not all of the activities described above in the general description or the examples are required, that a portion of a specific activity may not be required, and that one or more further activities may be performed in addition to those described. Still further, the order in which activities are listed are not necessarily the order in which they are performed.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Many other embodiments may be apparent to those of skill in the art upon reviewing the disclosure. Other embodiments may be used and derived from the disclosure, such that a structural substitution, logical substitution, or another change may be made without departing from the scope of the disclosure. Accordingly, the disclosure is to be regarded as illustrative rather than restrictive.

Certain features are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A processing module comprising:
a plurality of components comprising a first processor device coupled to a circuit card operable to be coupled to a host processing system comprising a second processor device;
a processing module interface configured to be coupled to a host interface of the host processing system, the host processing system to operate in a run-time operating state during a first period while coupled to the processing module and to operate in a reduced operating state during a second period while coupled to the processing module, the host processing system configured to switch between the run-time operating state and the reduced operating state while coupled to the processing module;
wherein the processing module interface includes a plurality of contacts operable to couple a plurality of signals configured to be coupled between the host processing system and the circuit card to enable or disable use of resources of the circuit card during the reduced operating state of the host processing system, and wherein the first processor device and the second processor device are configured to communicate via one of the plurality of contacts to provide use of resources of the circuit card to the second processor device during the run-time operating state of the host processing system, the circuit card to activate a first resource of the circuit card in response to detecting a non-user initiated event during the reduced operating state of the host processing system; and
the plurality of contacts including a lid status contact operable to receive a lid status signal of the host processing system in response to an operating condition of a lid of the host processing system, wherein the first processor is operable to couple a video output signal to a first output in response to the lid status signal indicating that the lid is open, and to couple the video output signal to a second output in response to the lid status signal indicating that the lid is closed.

2. The processing module of claim 1, wherein the plurality of contacts includes a purchase validation contact operable to receive a purchase validation signal configured to enable use of at least a portion of the circuit card upon validating a purchase of a resource of the circuit card.

3. The processing module of claim 1, wherein the plurality of contacts includes a low voltage display signal (LVDS) contact operable to be coupled to a display resource of the host processing system.

4. The processing module of claim 1, wherein the plurality of contacts includes a dual function system management bus (SMBUS) contact operable to be coupled to a SMBUS of the host processing system.

5. The processing module of claim 1, wherein the plurality of contacts includes a universal serial bus (USB) direction contact operable to output a USB operating status signal of a USB coupled between the host processing system and a USB interface of the circuit card.

6. The processing module of claim 1, wherein the plurality of contacts includes a processing module operating contact configured to output an operating status signal.

7. The processing module of claim 1, wherein the circuit card activates the first resource based on a resource profile associated with the non-user initiated event.

8. The processing module of claim 1, wherein the plurality of contacts includes:
a purchase validation contact operable to receive a purchase validation signal configured to enable use of at least a portion of the circuit card upon validating a purchase of a resource of the circuit card;
a low voltage display signal (LVDS) contact operable to be coupled to a display resource of the host processing system;
a dual function system management bus (SMBUS) contact operable to be coupled to a SMBUS of the host processing system;
a universal serial bus (USB) direction contact operable to output a USB operating status signal of a USB coupled between the host processing system and a USB interface of the circuit card;
a processing module operating contact configured to output an operating status signal; and
a RS-232 signal interface contact operable to couple a RS-232 bus of the circuit card to a host RS-232 bus of the host processing system.

9. A host interface comprising:
a plurality of host contacts configured to be coupled to a processing module interface of a processing module operable to be coupled to a host processing system, the host processing system comprising a host processor to operate in a run-time operating state during a first period while coupled to the processing module and to operate in a reduced operating state during a second period while coupled to the processing module, the host processor configured to switch between the run-time operating state and the reduced operating state while coupled to the processing module; and
wherein the plurality of contacts are configured to couple a plurality of signals between the host processing system and the processing module to enable or disable use of the components of the processing module during the reduced operating state of the host processor of the host processing system and wherein the plurality of contacts comprise a contact to provide for communication between the host processor and a processor of the processing module during the run-time operating state of the host processor, the plurality of signals to activate a first resource of the processing module in response to detecting a non-user initiated event during the reduced operating state of the host processing system.

10. The host interface of claim 9, wherein the plurality of host contacts includes a purchase validation contact operable to receive a purchase validation signal configured to enable use of at least a portion of the processing module upon the host system validating a purchase of a resource of the processing module.

11. The host interface of claim 10, wherein the plurality of host contacts includes a low voltage display signal (LVDS) contact operable to be coupled to a display resource of the host processing system.

12. The host interface of claim 10, wherein the plurality of host contacts includes:
a dual function system management bus (SMBUS) contact operable to be coupled to a SMBUS of the host processing system; and
a universal serial bus (USB) direction contact operable to output a USB operating status signal of a USB coupled between the host processing system and a USB interface of the processing module.

13. The host interface of claim 9, wherein the plurality of host contacts includes:
a purchase validation contact operable to receive a purchase validation signal configured to enable use of at least a portion of the circuit card upon validating a purchase of a resource of the circuit card;
a low voltage display signal (LVDS) contact operable to be coupled to a display resource of the host processing system;
a dual function system management bus (SMBUS) contact operable to be coupled to a SMBUS of the host processing system;
a universal serial bus (USB) direction contact operable to output a USB operating status signal of a USB coupled between the host processing system and a USB interface of the circuit card; and
a RS-232 signal interface contact operable to couple a RS-232 bus of the circuit card to a host RS-232 bus of the host processing system.

14. An information handling system comprising:
a main circuit board including a host processor configured to operate in a run operating state and a reduced operating state;
a plurality of host contacts configured to be coupled to a processing module interface of a processing module operable to be coupled to the host processor, the host processor to operate in the run-time operating state during a first period while coupled to the processing module and to operate in the reduced operating state during a second period while coupled to the processing module, the host processor configured to switch between the run-time operating state and the reduced operating state while coupled to the processing module; and
wherein the processing module comprises:
a second processor;
a processing module interface configured to be coupled to a host interface; and
wherein the processing module interface includes a plurality of contacts operable to couple a plurality of signals configured to be coupled between the host processor and the processing module to enable or disable use of the components of the processing module during the reduced operating state of the host processor, the plurality of contacts operable to provide for communications between the host processor and the second processor during the run operating state, the processing module to activate a first resource of the processing module in response to detecting a non-user initiated event during the reduced operating state of the host processing system; and the plurality of contacts including a lid status contact operable to receive a lid status signal of the information handling system in response to an operating condition of a lid of the information handling system, wherein the first processor is operable to couple a video output signal to a first output in response to the lid status signal indicating that the lid is open, and to couple the video output signal to a second output in response to the lid status signal indicating that the lid is closed.

15. The information handling system of claim 14, further comprising:
a module enable input interface configured to initiate an enabling of the processing module in response to a user selecting the module enable input; and
a display configured to output a display signal received from the processing module using a LVDS signal coupled from the processing module interface to the host interface.

16. The information handling system of claim 14, further comprising:
a control module configured to validate purchased resources; and
a purchase validation signal output by the control module to enable use of at least a portion of the processing module upon validating a purchase of a resource of the processing module.

17. The information handling system of claim 14, further comprising the host interface and the processing module interface configured to communicate:
a purchase validation signal to enable use of at least a portion of the processing module upon validating a purchase of a resource of the processing module;
a low voltage display signal (LVDS) signal to a display resource;
a dual function system management bus (SMBUS) signal operable to be coupled to a host SMBUS;
a universal serial bus (USB) direction signal to identify a USB operating status of a USB interface coupled to a host USB;
a processing module operating signal including operating status of the processing module; and
a RS-232 signal operable to be coupled to a RS-232 bus of the processing module and a host RS-232 bus.

* * * * *